(12) United States Patent
Fögeling

(10) Patent No.: US 6,176,150 B1
(45) Date of Patent: Jan. 23, 2001

(54) SELF-PROPELLED AGRICULTURAL MACHINE WITH GEAR SHIFTING STEERING COLUMN

(75) Inventor: Walter Fögeling, Herzebrock-Clarholzl (DE)

(73) Assignee: CLAAS Selbstfahrende Erntemaschinen GmbH, Harsewinkel (DE)

( * ) Notice: Under 35 U.S.C. 154(b), the term of this patent shall be extended for 0 days.

(21) Appl. No.: 09/348,484

(22) Filed: Jul. 7, 1999

(30) Foreign Application Priority Data

Jul. 7, 1998 (DE) .............................................. 198 29 780

(51) Int. Cl.[7] .................................................. B60K 20/00
(52) U.S. Cl. .......................................... 74/473.21; 74/493
(58) Field of Search ................................ 74/473.21, 492, 74/493; 280/777

(56) References Cited

U.S. PATENT DOCUMENTS 4,033,158 * 7/1977 Chamberlain et al. ................. 74/493

4,762,015 * 8/1988 Katayama .............................. 74/493

FOREIGN PATENT DOCUMENTS 1755309    11/1971    (DE) .............................. A01D/41/02
4-342663 * 11/1992    (JP) .

* cited by examiner

Primary Examiner—Dirk Wright
(74) Attorney, Agent, or Firm—Husch & Eppenberger, LLC; Robert E. Muir

(57) ABSTRACT

An agricultural machine is equipped with a operator's cab and incorporates a gearbox which can be shifted through the various gear stages by means of a shift lever. The shift lever is coupled to the steering column when necessary by a coupling device such that the pivotal movement of the steering column can be utilized to shift gears in the gear box. To this end, an auxiliary pedal for releasing the steering column is provided in the cab in addition to the normal foot pedal. The auxiliary pedal initially releases the gas strut that is retaining the steering column and then inserts a locking pin into a blind hole in the shift lever when the steering column is in the relevant position. In this manner the operator has more free space because the number of elements in the controls are reduced.

12 Claims, 6 Drawing Sheets

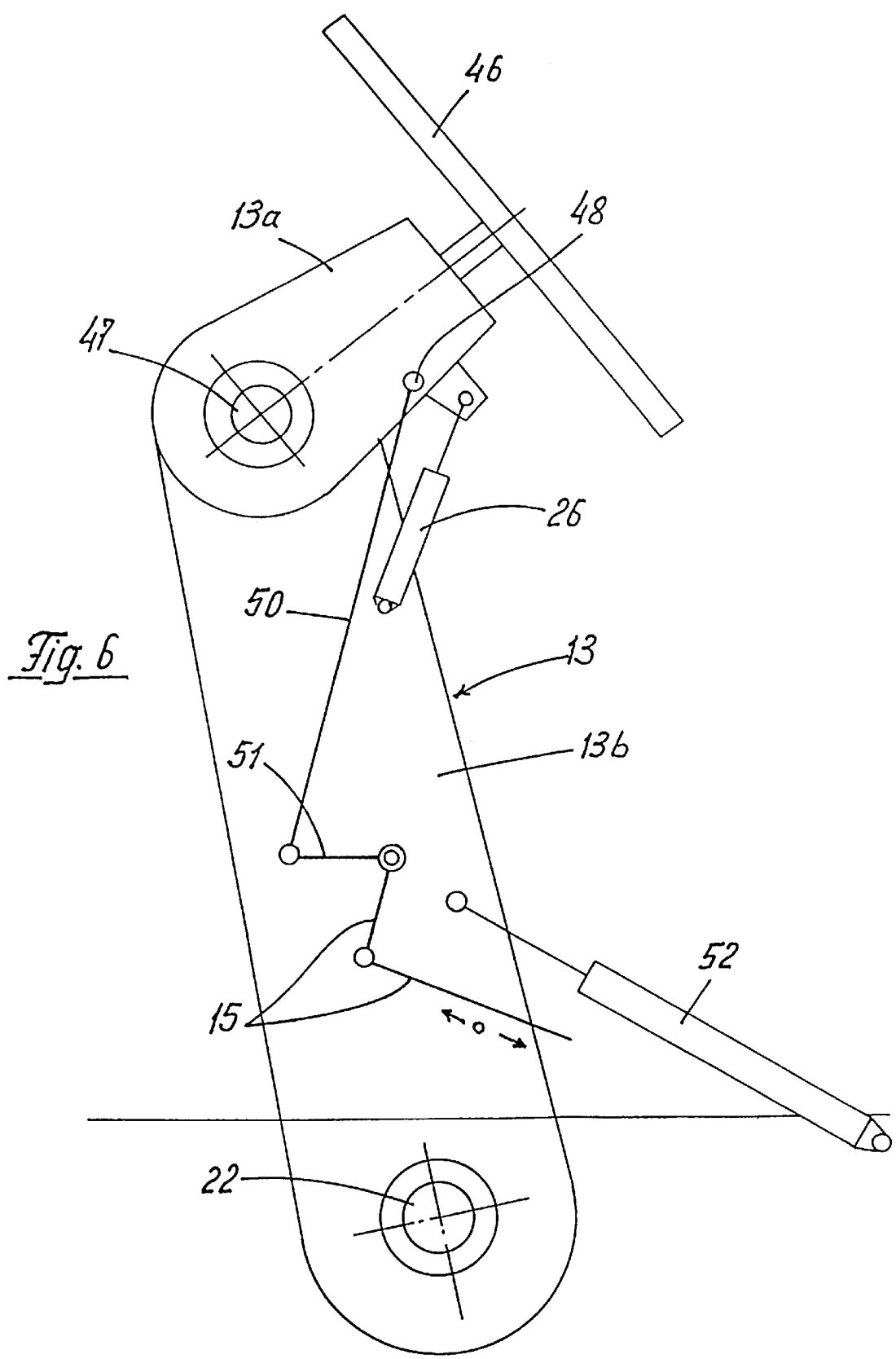

SELF-PROPELLED AGRICULTURAL MACHINE WITH GEAR SHIFTING STEERING COLUMN

BACKGROUND OF THE INVENTION

The invention relates generally to agricultural machines and more particularly to a self-propelled agricultural machine having a tiltable steering column to which a gear-shift lever is selectively operatively attached.

A multi-stage gearbox is a necessary requirement in self-propelled agricultural machines since the speed of travel is appreciably less when working in the field, such as harvesting, than when running on a highway. The gearbox forming the main drive mechanism normally comprises at least two forward gear stages in addition to a reverse gear stage. These three functions are accessible via a shift lever and a gear-shift-transfer element of the gear box coupled thereto. A rod-linkage assembly, an actuator link or a hydraulic device are suitable for the gear-shift-transfer element. The shift lever is coupled to the input member of the gear-shift-transfer element irrespective of the particular arrangement being used. The gear box is equipped with a slidable shaft on which the relevant gears are moved during a gear change. These gear shifts are effected while the machine is stationary and the speed of travel is regulated by a hydraulic drive arrangement when in either of the two gear stages. In harvesting machines known up to now, the manual shift lever was located in the cab adjacent the operator's seat.

A steering column supporting the steering wheel can be adjusted through a predetermined angular range both forwardly and backwardly in relation to the direction of travel of the agricultural machine so that each operator can set the steering wheel to the most comfortable position. For this purpose, the steering column is constructed as a single unit or consists of several mutually articulated sections. The base portion of the steering column is articulated to the floor of the operator's cab. Locking and releasing devices are provided near the pivotal point in both the single and the multi-section assemblies. These devices, in the form of hand or foot operated levers, are operable from the cab to actuate a control element in the form of a lockable gas strut, for example. In these known arrangements, the number of actuating elements in the cab has been found to be disruptive since they limit the operator's freedom of movement.

A steering device for a self-propelled combine harvester is known from DE 1755309 A1. This includes a joystick which is not used for steering the combine harvester but is connected to a control device so that e.g. the speed of travel of the combine harvester will be altered if the joystick is tilted in the direction of travel. In this case, the joystick is effective on a hydraulic device to alter the speed of travel of the combine harvester in a continuous manner should a sweeping motion occur in the direction of travel or vice versa. This document provides no insight about the operation of a mechanical gear box.

An object of the present invention is to provide a self-propelled agricultural machine in which the gear shifting function will be ensured in a simplified manner.

Another object is to provide a self-propelled agricultural machine having a gear shifting function but with reduced number of operating devices.

Yet another object is to provide a machine in accordance with the foregoing objects without limiting the ease of operation of the machine by overloading the driving position with operating devices of different sorts.

SUMMARY OF THE INVENTION

The objects are achieved by a gear-shift linkage coupled to the steering column or to a part of the steering column when necessary by means of an actuatable coupling device in a manner such that the movement of the gear-shift linkage required for shifting a gear in the gear box is derivable from the movement of the steering column.

In accordance with the present invention there is provided a self-propelled agricultural machine including a multi-stage gear box having shiftable gears; a cab having a floor; a steering column positioned above the floor of the cab; means for pivotally mounting the steering column for tilting movement between selected positions; a releasable locking device for holding the steering column in a selected position; a gear-shift linkage at least partly located under the floor of the cab and including a shift lever and a gear-shift-transfer element operatively connected to the multi-stage gearbox; and means for selectively coupling the gear-shift-transfer element to the steering column and including an actuatable locking device and so constructed and arranged that, when coupled, the movement of the gear-shift-transfer element required for shifting a gear in the multi-stage gear box is derived from movement of the steering column.

The ability to tilt the steering column is used to perform an additional function, i.e. the shift function in the gear box since the shift lever is selectively operatively coupled to the steering column as and when necessary. The shift lever will thus follow the pivotal movements of the steering column. The gear box can thereby be shifted when the harvesting machine is stationary. In normal operation, the coupling device is not operatively coupled to the steering column so that the steering column can be adjusted in the usual manner.

In one simple form, the previously described possibility is transposed in that the shift lever of the gear-shift linkage is freely rotatable on a pin which supports the steering column in rotatable manner, that the shift lever can be rotatably coupled to the steering column by means of the coupling device that is actuatable when necessary and in that an auxiliary pedal is provided for simultaneously actuating the coupling device and the trip arm for releasing the locking device. Adjustment of the steering column in the usual manner is still possible since the shift lever is freely rotatable on the pin which supports the steering column. Thus, as a result, the shift lever will remain still if it is merely the steering column that is being adjusted. However, if the shift lever is rotatably coupled to the steering column by the coupling device then it will follow the pivotal movements of the steering column. These pivotal movements will then be used for operating the gear box, whereby at least the input member of the gearshift transfer element, a lever for example, must be appropriately designed and must be located close to the steering column. Operation of the gear box is not made more difficult for the operator since he only has to actuate the auxiliary pedal thereby coupling the shift lever to the steering column via the coupling device. After the shift process has been accomplished, the auxiliary pedal will no longer be actuated so that, by actuating the normal foot pedal, the steering column will be brought back into the wanted position. This is then locked when the foot pedal is released. However, before the next shift process can be effected, it will first be necessary to move the steering column into the position corresponding to the gear stage in use and then to couple the shift lever to the steering column via the coupling device by actuating the auxiliary pedal. It is expedient if the shift lever and the gear-shift-transfer element connected thereto are both designed such that the gear box will be in the neutral position when the steering column is in its mid position and that the gear box will be in one of its other two gear stages when the steering column is in one of its two end positions.

One constructively simple arrangement is obtained when the coupling device consists basically of a spring loaded locking pin that is moveable in a direction along the steering axis of the steering column, said pin being offset relative to the steering column and guided in a guide body fixed to the steering column. In addition, it is arranged such that it can be inserted into the coupling to the shift lever by means of the auxiliary pedal against the effect of the pressure spring. After the steering column has been placed in the correct position vis a vis the current position of the shift lever, the locking pin can be engaged with the shift lever so that the shifting process can be effected by tilting the steering column. The gear-shift-transfer element or even the gear box should be arranged in such a way that the relevant gear stage will remain selected after the shifting process.

To ensure that the operator only has to actuate the auxiliary pedal for effecting the shifting process, a further embodiment provides for the pivotal axis of the auxiliary pedal to be coupled to the pivotal axis of the foot pedal. When the auxiliary pedal is stepped on, the pedal will be driven simultaneously whereby the trip arm will likewise be actuated so that the steering column can be moved and the locking pin will then engage in the shift lever due to the pressure of the spring as soon as it is located in the appropriate position. Nevertheless, following the shifting process, the operator will have to actuate the foot pedal in order to place just the steering column in the wanted position. This is particularly simple if the auxiliary pedal is fixed to a rotatably mounted pin, if a pedal sleeve is rotatably mounted on the pin, and if the foot pedal and the trip arm are fixedly arranged on the pedal sleeve in such a manner that the pin fixed to the auxiliary pedal will remain stationary when the foot pedal is actuated. To this end, provision is made for at least one transverse stud that protrudes beyond the outer surface of the pin to be fixed in said pin, and, for peripherally extending slots, which are engaged by the projecting ends of the transverse stud, to be provided in the pedal sleeve. These slots are designed such that the pedal sleeve and hence the foot pedal will be driven when the auxiliary pedal is stepped on. The slots are mutually displaced through an angle of 180° and extend over a radial range which is such as corresponds to the pivotal angle of the auxiliary pedal.

In another embodiment, provision is made for the guide body to be in the form of segments and for it to comprise a guide bushing for the locking pin on the side thereof remote from the pivotal axis.

To easily couple the locking pin to the shift lever, provision is made for the shift lever to comprise a hub in whose external surface, on the side thereof facing the auxiliary pedal, there is incorporated a blind hole into which the locking pin is insertible.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 6 is a schematic of a steering column including an upper and a lower member together with a linkage system.

DETAILED DESCRIPTION

Figure 1:
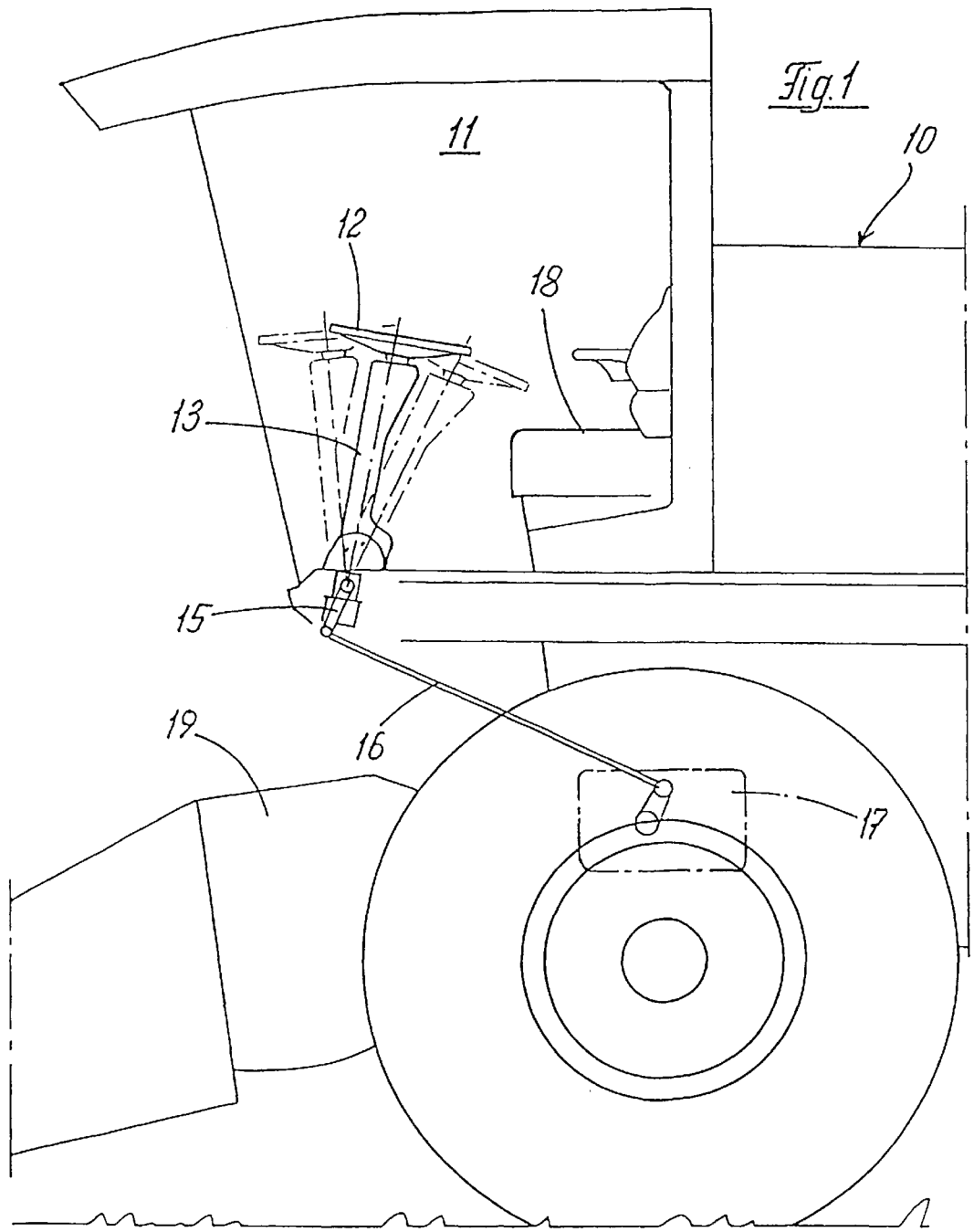
FIG. 1 is a schematic side view of a operator's cab of an agricultural harvesting machine incorporating an embodiment of the invention.

The front end of a partially shown agricultural harvesting machine 10 is equipped with a operators cab 11 in which a steering column 13 supporting a steering wheel 12 is installed. The self-propelled agricultural machines under especial consideration here are self-propelled combine harvesters and choppers. The steering column is adjustable over an adjustment range in the direction of travel as shown in phantom lines in FIGS. 1 and 2. The steering wheel 12 is fixed to the steering shaft 14. A shift lever 15 with which a gear box 17 can be operated via a gear-shift-transfer element 16 is attached to the steering column 13 in a manner subsequently described. The operator's seat 18 together with other elements needed for operating the agricultural harvesting machine 10 are also installed in the operator's cab 11 although these are not shown so as to simplify the drawing. A feeder housing 19 for the harvested crop is located directly in front of the operator's cab 11 although this too will not be described in detail. To simplify the drawing, the gear-shift-transfer element 16 is illustrated in the form of a rod although multi-part shift linkages or flexible links or hydraulic devices could be used. The steering shaft 14 is a component of the steering column 13. The latter is pivotally mounted on two aligned, fixed pins 21, 22. As shown in FIG. 3, the pins 21, 22 are inserted through lug eyes 23, 24 attached to a fixed bearing plate 25. A retaining element in the form of a lockable gas strut 26 serves to lock the steering column 13 in the various moved positions. As shown in FIG. 2, a trip arm 28 is engaged with the connecting rod 27 of the gas strut 26. When the foot pedal 29 is actuated, the trip arm 28 is pivoted so the connecting rod 27 is driven into the cylindrical housing thereby releasing the steering column 13. The gas strut 26 is suspended from an arm 30 of the bearing plate 25 at the end thereof opposite the trip arm 28.

A guide body 31 and the shift lever 15 are each freely rotatably mounted immediately adjacent the lug eye 24, on the right hand pin 22 as seen in FIG. 3. The guide body 31 is conveniently of segmental construction and is provided with a guide bushing 32 on the side thereof remote from the shift lever 15. A locking device in the form of a locking pin 33 is insertible into the guide bushing 32. The locking pin 33 is pressed against an auxiliary pedal 35 by means of a pressure spring 34. To this end, the locking pin is provided with a shoulder for supporting one end of the pressure spring 34 and the other end of the pressure spring is supported by the guide body 31. The spring is conveniently circumjacent the guide bushing 32.

Figure 4:
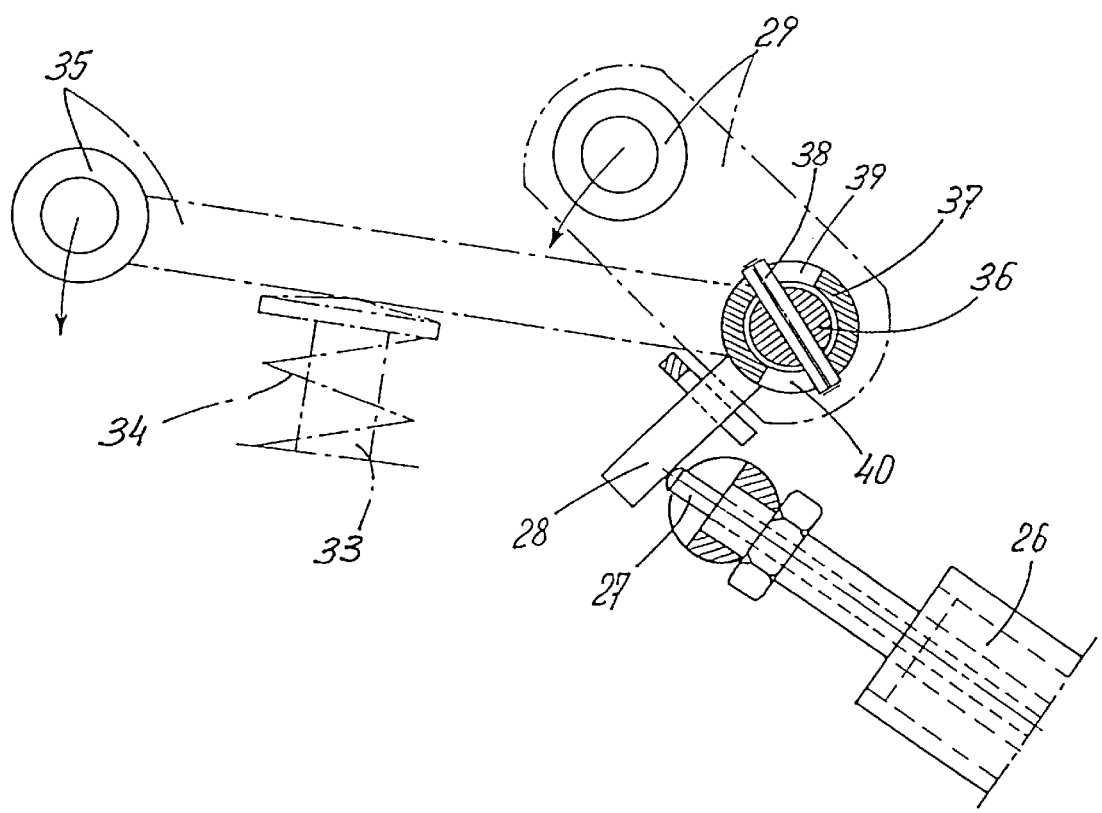
FIG. 4 is a larger scale view, partly schematic and partly in vertical section, and showing the foot and auxiliary pedals co-operating with a retaining element.

As is shown in FIG. 4, the auxiliary pedal 35 is connected to a pin 36 which is rotatably mounted in the steering column 13. In addition, a pedal sleeve 37, which is fixed to the foot pedal 29, is mounted in rotatable manner on the pin 36. The pedal sleeve 37 extends over the region extending from the foot pedal 29 to a free end opposite the auxiliary pedal. A transverse stud 38 is fixed in the pin 36. The ends of the transverse stud 38 project beyond the outer surface of the pin 36 and engage in the slots 39, 40 in the pedal sleeve 37. The slots 39, 40 extend peripherally of the pedal sleeve 37 over a certain angular range and are mutually displaced by 180°.

As is shown in FIGS. 2 and 3, the hub 15a of the shift lever 15 is provided with a blind hole 41 on the side thereof facing the locking pin 33. The locking pin 33 can be inserted into the blind hole 41 as will be later described in detail.

Figure 2:
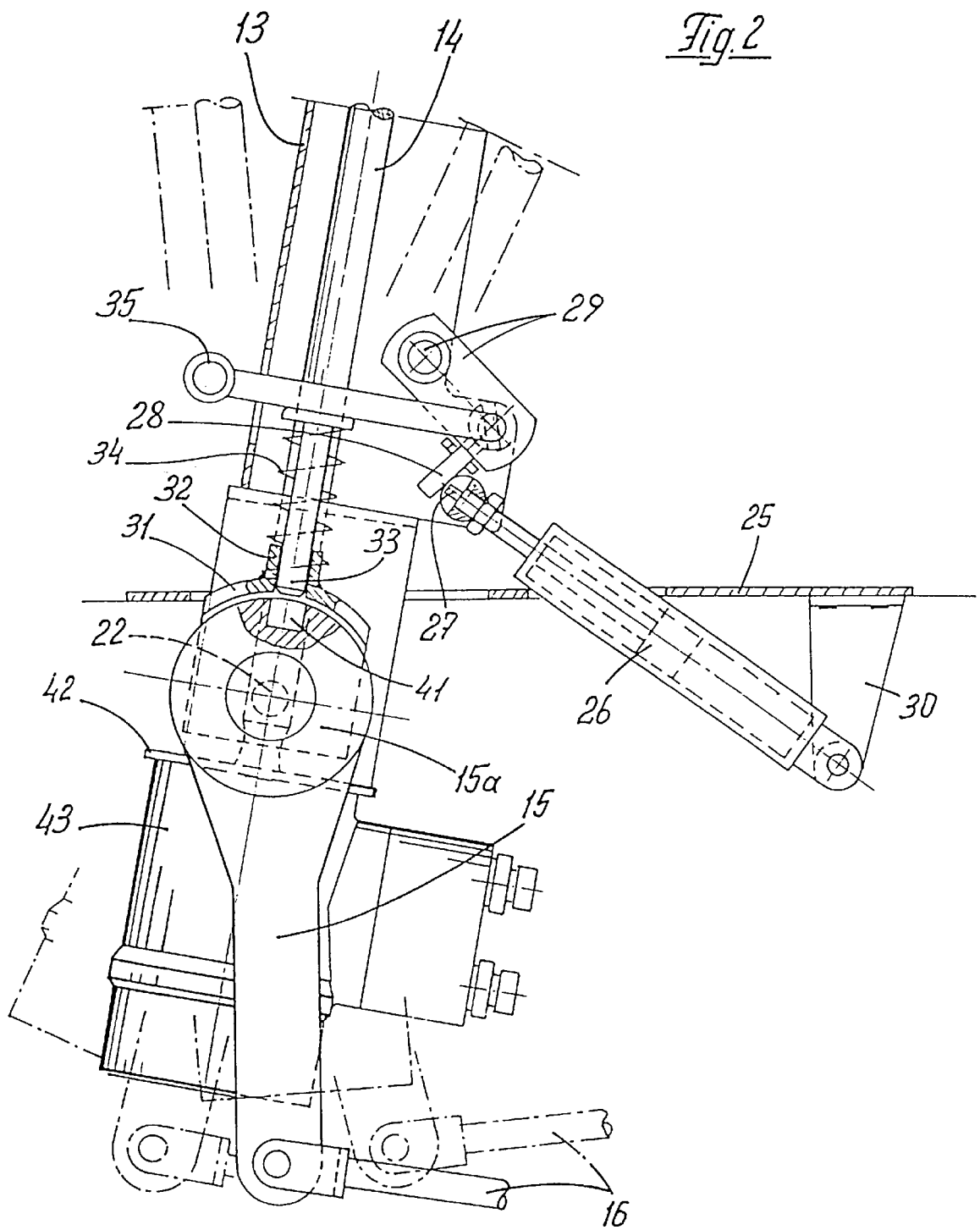
FIG. 2 is a view, partly a side view and partly in section, of a portion of a steering column and an associated adjusting and shifting device.
Figure 3:
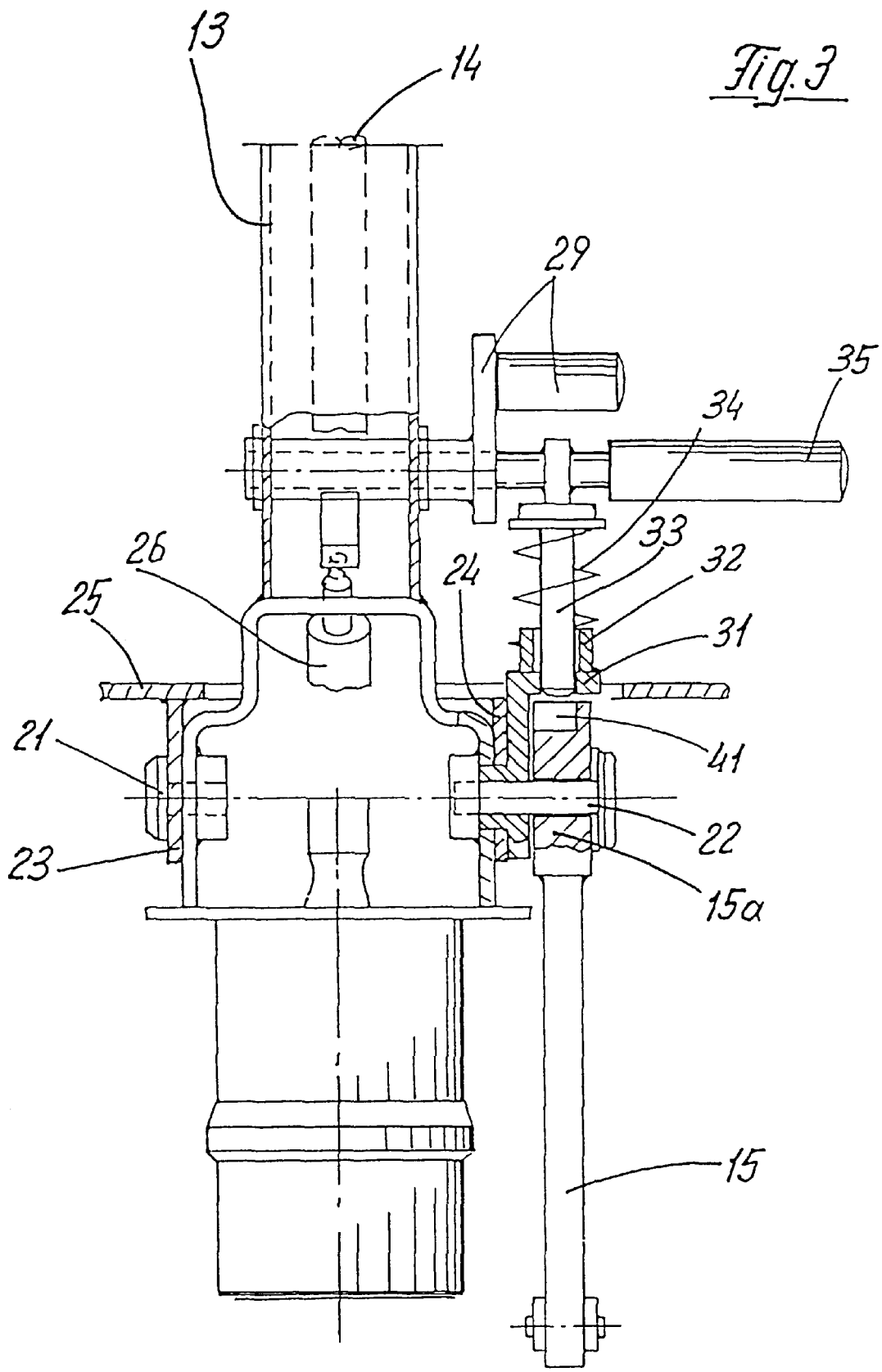
FIG. 3 is a front view of the arrangement as seen from the left of FIG. 2.

The steering column 13 is located in its mid position as illustrated by the solid lines in FIGS. 1 and 2. The shift lever 15 is also in its mid position and is also illustrated by solid lines. Insofar as the gear box 17 may be switched between three gear stages, this mid position of the shift lever 15 corresponds to the neutral position. The two end positions of the steering column 13 are indicated by the phantom lines as are those of the shift lever 15 and the gear-shift-transfer element 16. To alter the position of the steering column 13, the operator first actuates the foot pedal 29. The operator can then adjust the steering column continuously within its adjustment range as soon as the lockable gas strut 26 has released the steering column 13. This position is then secured when the operator takes his foot off the foot pedal 29. If, however, the operator wishes to switch the gear box 17 to another gear stage, he has to pivot the auxiliary pedal 35 in the same direction. The transverse stud 38 then causes the pedal sleeve 37 and hence the foot pedal 29 to move with it. However, the auxiliary pedal 35 can only be moved over its full pivotal angle if the steering column 13 has been placed in a position corresponding to the position of the shift lever 15 so that the locking pin 33 can enter the blind hole 41. The shift lever 15 is then operatively coupled to the steering column 13 via the locking pin 33. The shift lever 15 will then pivot on the pin 22 in response to a corresponding pivotal motion of the steering column 13 so that the gear box 17 can be switched to the wanted gear stage via the gear-shift-transfer element 16. When the auxiliary pedal 35 is released, the locking pin 33 is disengaged from the hub 15a of the shift lever 15 due to the action of the pressure spring 34. The position of the steering column 13 is then retained by means of the lockable gas strut 26. The operator will then actuate the foot pedal 29 to adjust it. It is deemed apparent from FIG. 2 in particular, that the auxiliary pedal 35 can be actuated only when the locking pin 33 is aligned with the blind hole 41. Since the gear box 17 is normally only provided with three gear stages, the steering column 13 need only be moved into either of its two end positions or into the mid position in dependence on the position of the shift lever 15. The lower portion of the steering column 13 associated with the fixed pins 21, 22 is fork-shaped. A mounting plate 42 on which the hydraulic steering valve 43 is installed, is attached to its free end.

Figure 5:
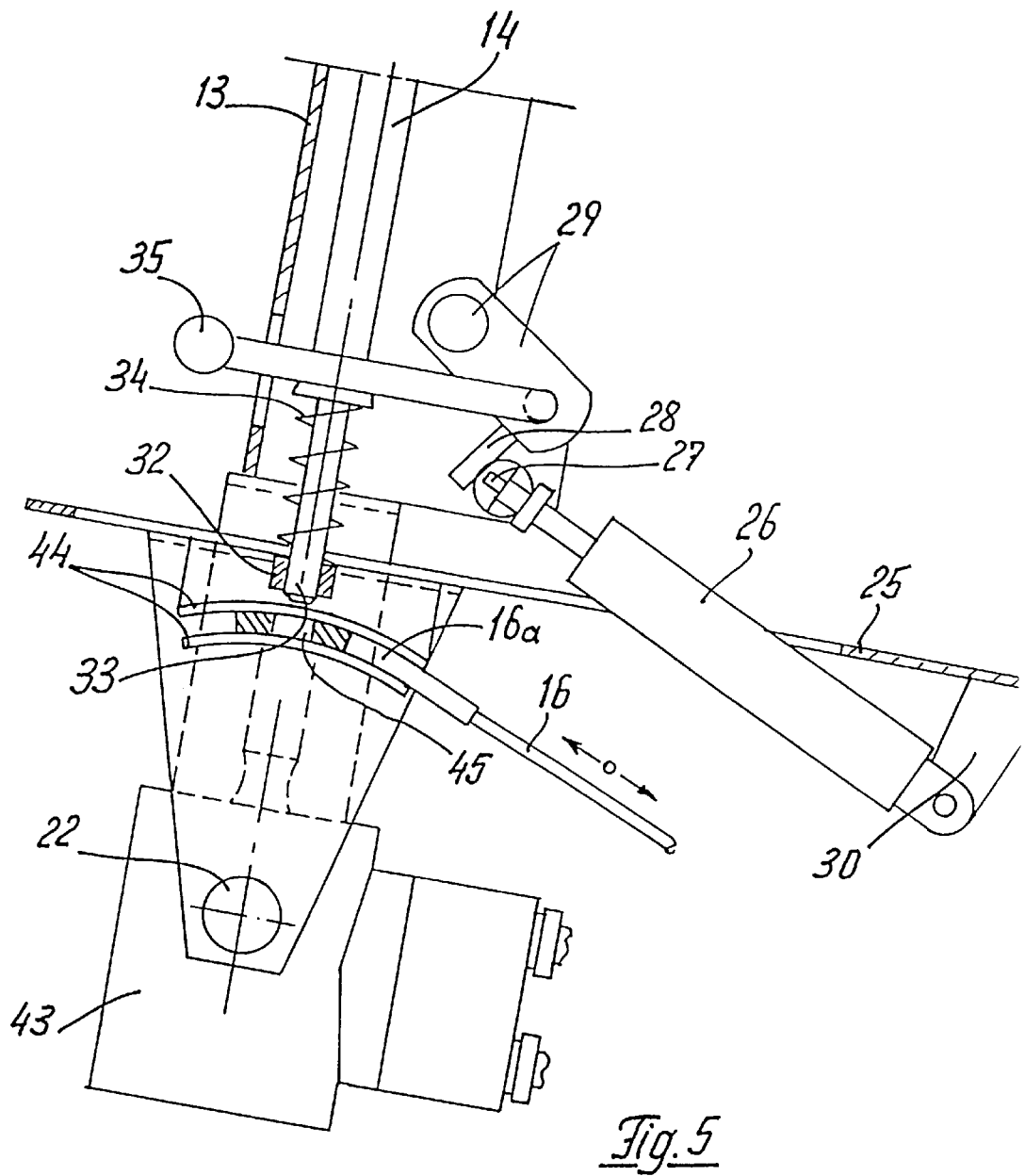
FIG. 5 is a view similar to FIG. 2, but showing a steering column and another embodiment of the associated adjusting and shifting device.

The embodiment of FIG. 5 differs from that of FIG. 2 basically in that the gear-shift linkage 16 is operatively connected directly to the steering column or to the locking pin 33 by means of a slide member 16a. To this end, the slide member 16a is curved in correspondence with the shape of its guideways 44. The guideways 44 are fixed to the machine in any convenient manner. The guideways 44 extend concentrically of the pivotal axis of the steering column 13 as defined by the pin 22. A bore 45 is provided in the end part of the slide member 16a, the locking pin 33 engaging in this bore 45 in the manner previously described during the shifting process. The concentric design of the guideways 44 allows the steering column 13 to be pivoted for adjustment purposes independently of the slide member 16a.

FIG. 6 schematically depicts a steering column 13 comprising an upper member 13a and a lower member 13b. The upper member 13a supports the steering wheel 46. The upper member 13a and the lower member 13b are pivotal together about the pin 22. Moreover, the upper member 13a is pivotal about a bearing pin 47 which serves as a point of articulation between the upper member 13a and the lower member 13b. Control arms 50, 51 of a transfer linkage are mounted on a fixed pin 48 on the upper member 13a and a fixed pin 49 on the lower member 13b. These control arms 50, 51 allow the upper member 13a to pivot about the bearing pin 47. If the transfer linkage is blocked, the shift lever 15 of the gear-shift linkage will be pivoted about the pin 49 on the lower member 13b thereby initiating a shifting process. A further lockable gas strut 52 is attached to the lower member 13b for locking purposes.

It is now deemed apparent that the matter of importance is that an actuating device for the functional elements, which device can be coupled in when necessary, be provided between the pivotal steering column sections and a further functional element.

The invention is not restricted to the embodiments illustrated, but departures therefrom may be made therefrom within the scope of the accompanying claims without departing from the principles of the invention and without sacrificing its chief advantages.

I claim:

1. A self-propelled agricultural machine including a multi-stage gear box having shiftable gears; a cab having a floor; a steering column positioned above the floor of the cab; means for pivotally mounting the steering column for tilting movement between selected positions; a releasable locking device for holding the steering column in a selected position; a gear-shift linkage at least partly located under the floor of the cab and including a shift lever and a gear-shift-transfer element operatively connected to the multi-stage gearbox; and means for selectively coupling the gear-shift-transfer element to the steering column and including an actuatable locking device and so constructed and arranged that, when coupled, the movement of the gear-shift-transfer element required for shifting a gear in the multi-stage gear box is derived from movement of the steering column.

2. A self-propelled agricultural machine in accordance with claim 1, including a pin on which the shift lever of the gear-shift-transfer element is freely rotatable and which pin supports the steering column in rotatable manner, a coupling device for rotatably coupling the shift lever to the steering column, and an auxiliary pedal so constructed and arranged for simultaneously actuating the coupling device and releasing the locking device.

3. A self-propelled agricultural machine in accordance with claim 1 wherein the steering column has a steering shaft, the locking device includes a spring-loaded locking pin that is moveable in a direction extending along the steering shaft, said spring-loaded locking pin being offset relative to the steering shaft and guided in a guide body fixed to the steering column, a spring, and a coupling connection to the shift lever into which the locking pin can be inserted against the effect of the spring.

4. A self-propelled agricultural machine in accordance with claim 3, including an auxiliary pedal for selectively moving the locking pin.

5. A self-propelled agricultural machine in accordance with claim 4, including a rotatably mounted pin, a pedal sleeve is rotatably mounted on the pin, and a foot pedal and a trip arm fixedly arranged on the pedal sleeve; and wherein the auxiliary pedal is fixed to the rotatably mounted pin, whereby the rotatably mounted pin will remain stationary when the foot pedal is actuated.

6. A self-propelled agricultural machine in accordance with claim 5, including at least one transverse stud which protrudes beyond the outer surface of the rotatably mounted pin and is fixed in said pin, and wherein the pedal sleeve has peripherally extending slots which are engaged by the projecting ends of the transverse stud.

7. A self-propelled agricultural machine in accordance with claim 1, including a guide body in the form of segments, said guide body including a guide bushing for the locking pin on a side remote from the pivotal axis.

8. A self-propelled agricultural machine in accordance with claim 1, wherein the shift lever includes a hub having an external surface which incorporates a blind hole into which the locking pin is insertible.

9. A self-propelled agricultural machine in accordance with claim 1, including least one guideway concentric with the pivotal axis and provided on the steering column, the gear-shift linkage having a slide member insertible in said guideway and arranged such that it can be coupled to the steering column by means of the locking device.

10. A self-propelled agricultural machine in accordance with claim 1, wherein the steering column includes an upper member and a lower member which are mutually articulated.

11. A self-propelled agricultural machine in accordance with claim 10, wherein the upper member and the lower member are pivotal about a common axis and the lower member alone is pivotal about this axis and wherein the upper member alone is pivotal about the axis linking the upper member and the lower member.

12. A self-propelled agricultural machine in accordance with claim 10, including a transfer lever comprising a plurality of control arms, and a blocking member attached to the upper member of the steering column.

* * * * *